United States Patent [19]

Kasugai et al.

[11] Patent Number: 5,402,818
[45] Date of Patent: Apr. 4, 1995

[54] FUEL SHUT-OFF DEVICE

[75] Inventors: Joji Kasugai; Yoshihiro Nagino; Toshihiko Asaya, all of Inazawa, Japan

[73] Assignee: Toyoda Gosei Co., Ltd., Nishikasugai, Japan

[21] Appl. No.: 132,916

[22] Filed: Oct. 7, 1993

[30] Foreign Application Priority Data

Oct. 30, 1992 [JP] Japan .................................. 4-315759

[51] Int. Cl.⁶ .......................................... F16K 17/196
[52] U.S. Cl. ...................................... 137/198; 137/43; 137/44; 137/202; 137/493.4; 137/512.2; 137/587
[58] Field of Search ................... 137/198, 202, 493.4, 137/493.5, 587, 43, 512.2, 44

[56] References Cited

U.S. PATENT DOCUMENTS

| | | | |
|---|---|---|---|
| 4,000,828 | 1/1977 | Crute | 137/43 X |
| 4,679,581 | 7/1987 | Mears . | |
| 4,905,726 | 3/1990 | Kasugai et al. . | |
| 4,913,303 | 4/1990 | Harris | 137/43 X |
| 5,028,244 | 7/1992 | Szlaga . | |
| 5,156,178 | 10/1992 | Harris | 137/43 |

FOREIGN PATENT DOCUMENTS 2274622 11/1990 Japan .

Primary Examiner—Robert G. Nilson
Attorney, Agent, or Firm—Cushman, Darby & Cushman

[57] ABSTRACT

In a first valve mechanism 30, a positive pressure spring 31 presses a first valve plug 34 to seat an external ring projection 37 of the first valve plug 34 onto a bottom surface 39 of a support cylinder 35. The first valve mechanism 30 opens at a first valve-opening pressure P1 responsive to a pressure balance across the positive pressure regulating valve plug 34. In a safety valve mechanism 60, the same spring (the positive pressure spring 31) presses a safety valve plug 61 via the external ring projection 37 seated on the bottom surface 39 to seat a sealing ring projection 62 of the safety valve plug 61 onto an upper face 63 of a partition wall 28. The safety valve mechanism 60 opens at a second valve-opening pressure P2 responsive to a pressure balance across the safety valve plug 61. A pressure receiving area S1 of the positive pressure regulating valve plug 34 and a pressure receiving area S2 of the safety valve plug 61 are determined to open the positive pressure regulating valve mechanism 30 but maintain the safety valve mechanism 60 in its closing state when an internal pressure of a fuel tank reaches the first valve-opening pressure P1.

10 Claims, 8 Drawing Sheets

FUEL SHUT-OFF DEVICE

BACKGROUND OF THE INVENTION

The priority application No. 4-315759 filed in Japan on Oct. 30, 1992 is hereby incorporated hereinto by this reference.

1. Field of the Invention

The present invention relates to a fuel shut-off device which releases fuel vapor from a fuel tank and prevents fuel liquid from flowing out from the fuel tank.

2. Description of Related Art

Discharge of fuel liquid and fuel vapor from a fuel tank of a vehicle into the atmosphere is undesirable, for environmental protection. A fuel shut-off device is therefore provided with a fuel tank to prevent the discharge of the fuel. Another important function of the fuel shut-off device is to maintain the internal pressure of the fuel tank within a predetermined range, to thereby prevent the rupture of the fuel tank.

A conventional fuel shut-off device as disclosed in JAPANESE PATENT LAID-OPEN GAZETTE No. 2-274622 comprises a float valve, which rises to shut-off preventing effusion of the fuel liquid from the fuel tank. More concretely, the float valve rises due to a flow of the fuel liquid into the fuel shut-off device to block a conduit in the device connected with the external apparatus.

The fuel shut-off device also comprises a positive pressure regulating valve which maintains the internal pressure of the fuel tank under a predetermined high level. The internal pressure of the fuel tank is regulated in the following manner. Suppose that the level of the fuel liquid is far below the fuel shut-off device. If the internal pressure of the fuel tank is increased by vaporization of the fuel liquid, the positive pressure regulating valve works to discharge the fuel vapor to an external apparatus, thereby mitigating the internal pressure of the fuel tank. The external apparatus is, for example, an activated charcoal canister which adsorbs fuel vapor.

The fuel shut-off device further comprises a negative pressure regulating valve which introduces fuel vapor from the external canister to the fuel tank to increase the internal pressure of the fuel tank when the internal pressure of the fuel tank is below a predetermined low level.

Now suppose that the float valve shuts-off to prevent leakage of the fuel liquid from the fuel tank. Since the positive pressure regulating valve is shut-off from the internal pressure of the fuel tank in this state, it cannot prevent the internal pressure of the fuel tank from increasing undesirably. The fuel shut-off device therefore comprises a safety valve for directly (not via the positive pressure regulating valve) releasing the fuel vapor from the tank to the canister to decrease the internal pressure of the fuel tank.

As described above, the conventional fuel shut-off device comprises the positive pressure regulating valve and the safety valve for decreasing the internal pressure of the fuel tank. Each of the positive pressure regulating valve and the safety valve includes a spring which generates a pressing force to close the valve. Since the opening pressure of the safety valve is greater than that of the positive pressure regulating valve, the safety valve has a stronger spring than that of the positive pressure regulating valve in the conventional device.

SUMMARY OF THE INVENTION

The object of the invention is to provide an improved fuel shut-off device having a simpler structure for adjusting an internal pressure of a fuel tank and preventing effusion of fuel to an external apparatus.

The above and other related objects are realized at least partly by a fuel shut-off device for controlling an internal pressure of a fuel tank and preventing effusion of fuel liquid from the fuel tank.

The fuel shut-off device of the invention includes:

a casing having a connection port adapted to be coupled with an external apparatus;

a partition wall for dividing a space in the casing into an upper chamber having the connection port and a lower chamber, the lower chamber having a first opening for introducing fuel vapor and fuel liquid from the fuel tank, the partition wall having a connection hole to connect the upper chamber with the lower chamber;

an upper chamber division plate, disposed in the upper chamber to be vertically movable therein, for dividing the upper chamber into a first upper section and a second upper section arranged below the first upper section, the upper chamber division plate having a second opening which allows flow of the fuel vapor between the first upper section and the second upper section, the upper chamber division plate further having a conduit penetrating through the connection hole, the conduit connecting the first upper section and the lower chamber;

first force applying means, disposed in the first upper section of the upper chamber, for applying a first pressing force onto the upper chamber division plate toward the partition wall;

a first valve mechanism, disposed in the first upper section, for decreasing the internal pressure of the fuel tank, the first valve mechanism having a first valve plug for opening and closing a top of the conduit responsive to the internal pressure of the fuel tank, the first valve plug being seated on an upper surface of the upper chamber division plate, the first valve plug receiving an internal pressure of the upper chamber and the first pressing force of the first force applying means toward the upper chamber division plate, the first valve plug having a first pressure receiving area for receiving the internal pressure of the lower chamber through the conduit in a direction to separate the first valve plug from the upper surface of the upper chamber division plate;

a float valve, disposed in the lower chamber, for closing a bottom of the conduit responsive to a flow of fuel liquid into the lower chamber; and a second valve mechanism, disposed in the second upper section, for decreasing the internal pressure of the fuel tank, the second valve mechanism having a second valve plug for opening and closing a path between the conduit and the connection hole responsive to the internal pressure of the fuel tank, the second valve plug moving with the conduit to seat on an upper surface of the partition wall, the second valve plug receiving the internal pressure of the upper chamber and the first pressing force of the first force applying means transmitted via the first valve plug and the upper chamber division plate to press the second valve plug against the upper surface of the partition wall, the second valve plug having a second pressure receiving area for receiving the internal pressure of the lower chamber through the path in a direction to separate the second valve plug from the upper surface of the partition wall, the second pressure receiving area of the second valve plug being smaller than the first pressure receiving area of the first valve plug.

In the fuel shut-off device of the invention thus constructed, the float valve rises to close a bottom of the conduit when the fuel liquid flows into the lower chamber, thus preventing effusion of fuel liquid into the first upper section of the upper chamber via the conduit. In the upper chamber, the first upper section, separated from the second upper section by the upper chamber division plate, is connected to the second upper section via the second opening to allow a flow of the fuel vapor. Closing the bottom of the conduit with the float valve prevents effusion of fuel liquid from the fuel tank to the connection port and an external apparatus.

The first valve plug of the first valve mechanism seated on the upper surface of the upper chamber division plate receives the internal pressure of the upper chamber and the pressure, determined by dividing the first pressing force of the first force applying means by the first pressure receiving area of the first valve plug, in a direction to press the first valve plug against the upper surface of the upper chamber division plate. The positive pressure regulating valve plug also receives the internal pressure of the fuel tank via the conduit in a direction to separate the first valve plug from the upper surface of the upper chamber division plate. The first valve mechanism closes and opens a top of the conduit responsive to a pressure balance across the first valve plug, and is kept in its closed position until the internal pressure of the fuel tank reaches a first valve-opening pressure of the first valve mechanism.

The second valve plug seated on the upper surface of the partition wall receives the internal pressure of the first upper section of the upper chamber and the pressure, determined by dividing the first pressing force of the first force applying means by the second pressure receiving area of the second valve plug, in a direction to press the second valve plug against the upper surface of the partition wall. The first pressing force is transmitted via the first valve plug and the upper chamber division plate.

The second pressure receiving area of the second valve plug is smaller than the first pressure receiving area of the first valve plug. The pressure applied to the second valve plug corresponding to the first pressing force of the first force applying means is thus greater than the pressure applied to the first valve plug. The second valve plug also receives the internal pressure of the fuel tank via the path between the conduit and the connection hole in a direction to separate the second valve plug from the upper surface of the partition wall. The second valve mechanism opens and closes the path responsive to a pressure balance across the second valve plug. Even when the internal pressure of the fuel tank reaches the first valve-opening pressure of the first valve mechanism, the pressure, in the direction to press the second valve plug against the upper surface of the partition wall, is still greater than the pressure in the opposite direction because of the difference between the first and second pressure receiving areas. The second valve mechanism is thus maintained in its closed position. When the internal pressure of the fuel tank exceeds a second valve-opening pressure of the second valve mechanism, which is greater than the first valve-opening pressure, the pressure balance across the second valve plug is broken to open the second valve mechanism. In short, the second valve mechanism is maintained in its closed position at the first valve-opening pressure and opens at the second valve-opening pressure.

When the conduit is shut by the float valve, the first valve mechanism does not receive the internal pressure of the fuel tank via the conduit, and the first valve plug is seated on the upper surface of the upper chamber division plate. Under such conditions, the first pressing force of the first force applying means is applied to the second valve plug of the second valve mechanism via the first valve plug seated on the upper chamber division plate, so that only the second valve mechanism works as described above.

These and other objects, features, aspects, and advantages of the present invention will become more apparent from the following detailed description of the preferred embodiment with reference to the accompanying drawings.

DETAILED DESCRIPTION OF THE PRESENTLY PREFERRED EXEMPLARY EMBODIMENTS

Figure 1:
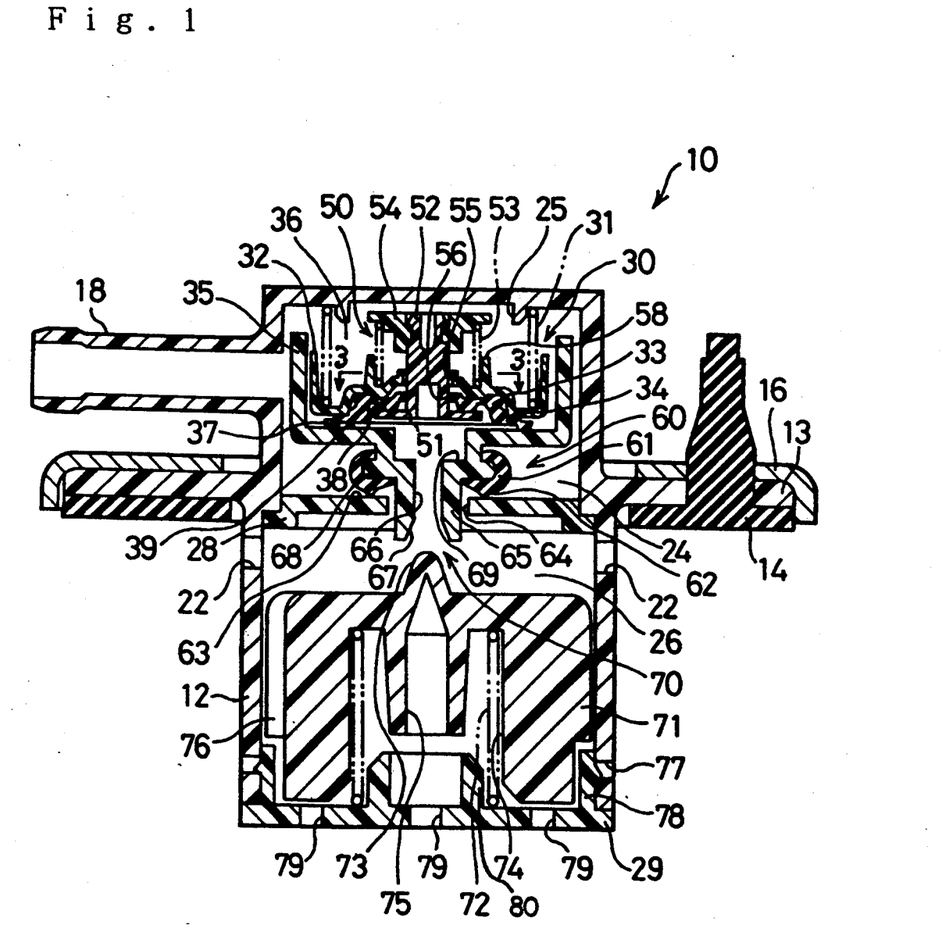
FIG. 1 is a cross sectional view of a fuel shut-off device 10 embodying the invention.

FIG. 1 is a cross sectional view of a fuel shut-off device 10 embodying the invention. The device 10 comprises a variety of valve mechanisms and structure members arranged in a substantially cylindrical casing 12.

The casing 12 is integrally formed as a cylindrical body having an opening at its lower end, and is composed of an oil resistant resin such as polyacetal or nylon. The outer wall of the casing 12 is formed to be a flange at the middle portion thereof. The fuel shut-off device 10 is attached to a wall of a fuel tank (not shown) with a packing 14 and a support plate 16. Here the packing 14 is disposed between the flange 13 and an upper wall of the fuel tank, and the support plate 16 is fixed to stud bolts of the fuel tank. When the fuel shut-off device 10 is fixed to the fuel tank, a section lower than the flange 13 is located within the fuel tank while an upper section is protruded from the fuel tank.

The casing 12 is further provided with a vent port 18, which is transversely protruded from a side wall of the cylindrical casing 12 to extend above the flange 13 and connected with an activated charcoal canister (not shown). A plurality of vapor holes 22 are formed on the side wall of the casing 12 below the flange 13. Fuel vapor in the fuel tank flows into the fuel shut-off device 10 through the plurality of vapor holes 22, and fuel liquid in the fuel tank may flow into the fuel shut-off device 10 through the plurality of vapor holes 22 when, for example, the vehicle makes an abrupt turn.

The casing 12 is divided into an upper chamber 24 and a lower chamber 26 by a partition wall 28 which is ultrasonically welded onto the approximate center of the inner wall of the casing 12. The opening at the bottom of the casing 12 is sealed with a cover plate 29. The partition wall 28 and the cover plate 29 are composed of the same oil resistant resin as the casing 12.

A plurality of valve mechanisms including a positive pressure regulating valve mechanism 30, a negative pressure regulating valve mechanism 50, and a safety valve mechanism 60, are accommodated in the upper chamber 24 of the casing 12. The positive pressure regulating valve mechanism 30 discharges fuel vapor in the fuel tank to the canister to lower the internal pressure of the fuel tank when a float valve 71 (hereafter described) in the lower chamber 26 stays open. The negative pressure regulating valve mechanism 50, on the other hand, introduces the fuel vapor from the canister into the fuel tank to raise the internal pressure of the fuel tank. The positive pressure regulating valve mechanism 30 and the negative pressure regulating valve mechanism 50 constitute a two-directional valve between the canister and the fuel tank to adjust the internal pressure of the fuel tank within a predetermined range.

The safety valve mechanism 60 discharges fuel vapor in the fuel tank to the canister to prevent undesirable increase of the internal pressure of the fuel tank. This safety valve mechanism 60 can be activated while the float valve 71 shuts-off.

Figure 2:
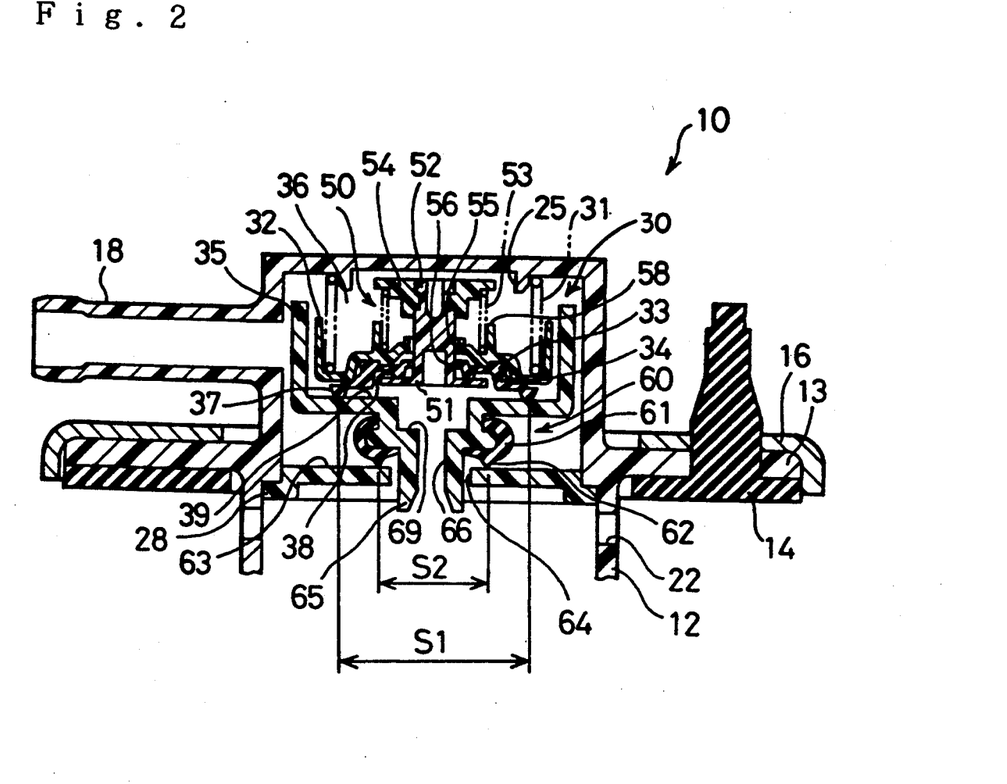
FIG. 2 is an upper section of the fuel shut-off device of FIG. 1, more specifically illustrating the relationship between a pressure receiving area S1 of a positive pressure regulating valve plug 34 and a pressure receiving area S2 of a safety valve plug 61, and an opening state of a positive pressure regulating valve mechanism 30 and a safety valve mechanism 60.

FIG. 2 illustrates the upper section of the fuel shut-off device 10. The positive pressure regulating valve mechanism 30 comprises a positive pressure spring 31, a valve support 32, and a positive pressure regulating valve plug 34. The positive pressure spring 31 is fitted outside a projection 25 protruded downward from an upper wall of the upper chamber 24. The valve support 32 is pressed downward by the positive pressure spring 31, whereas the positive pressure regulating valve plug 34 is fitted in, and fixed to, a recess 33 formed at a lower face of the valve support 32. In the positive pressure regulating valve mechanism 30, the positive pressure regulating valve plug 34, fixed to the valve support 32, is vertically movable in a hollow 36 of a support cylinder 35 which constitutes a conduit for fuel vapor flowing from the lower chamber 26 to the upper chamber 24. The positive pressure regulating valve plug 34 is composed of nitrile rubber, fluororubber, or the like while the valve support 32 and the support cylinder 35 are made of the same oil resistant resin as the casing 12 and the cover plate 29.

The positive pressure regulating valve plug 34 includes an external ring projection 37 protruded from circumference thereof and a stepwise internal ring projection 38 protruded inwardly. The positive pressure regulating valve plug 34 receives a downward force from the spring 31 via the valve support 32. The support cylinder 35 for accommodating the positive pressure regulating valve plug 34 has, on its lower center, a fuel shut-off part 65, which passes through the partition wall 28 and opens to the lower chamber 26. A through hole 66 running in the center of the fuel shut-off part 65 forms a conduit for fuel vapor flowing from the lower chamber 26 to the upper chamber 24. The lower end of the fuel shut-off part 65 is slightly tapered to form a float seal surface 67, which receives and comes into close contact with a tip of the float valve 71. An upper portion of the fuel shut-off part 65 is protruded outward to form a ring projection 68, and further extended upward to define an internal space having a diameter larger than that of the through hole 66 and forms a step 69 above the through hole 66. There is a certain clearance between the partition wall 28 and the fuel shut-off part 65 to form a vertical path 64.

The positive pressure regulating valve mechanism 30 operates responsive to a balance between two pressures across the positive pressure regulating valve plug 34. The first pressure is a combination of the pressure in the hollow 36, or the canister pressure transmitted via the vent port 18, and the pressure caused by the pressing force of the positive pressure spring 31. The second pressure is that in the lower chamber 26, or the internal pressure of the fuel tank.

When the pressure in the hollow 36 is heightened, the positive pressure regulating valve plug 34 is pressed downward, and the external ring projection 37 is seated on an inner bottom surface 39 of the support cylinder 35, so that the positive pressure regulating valve mechanism 30 closes to disconnect the hollow 36 or the canister from the lower chamber 26.

On the contrary, when the internal pressure of the fuel tank applied onto the positive pressure regulating valve plug 34 becomes greater than the first pressure (the canister pressure in the upper chamber 24 plus the pressing force of the positive pressure spring 31), the positive pressure regulating valve plug 34 is lifted up against the positive pressure spring 31. The external ring projection 37 of the positive pressure regulating valve plug 34 is thereby separated from the bottom surface 39, and the positive pressure regulating valve mechanism 30 opens to connect the hollow 36 in the upper chamber 24 with the lower chamber 26 via the through hole 66. In other words, when the internal pressure of the fuel tank exceeds a first valve-opening pressure P1 required for opening the positive pressure regulating valve mechanism 30, the positive pressure regulating valve mechanism 30 opens to mitigate the internal pressure of the fuel tank to the first valve-opening pressure P1. The first valve-opening pressure P1 corresponds to a difference between the canister pressure and the internal pressure of the fuel tank because the canister pressure is virtually constant.

The negative pressure regulating valve mechanism 50 operates in cooperation with the internal ring projection 38 on the positive pressure regulating valve plug 34 of the positive pressure regulating valve mechanism 30 as shown in FIGS. 1 and 2. The negative pressure regulating valve mechanism 50 comprises a negative pressure regulating valve plug 52 having a collar 51. The collar 51 functions as a seat of the internal ring projection 38 of the positive pressure regulating valve plug 34. The negative pressure regulating valve plug 52 passes through the central part of the positive pressure regulating valve plug 34 and the valve support 32. A spring support 54 is engaged with and fixed to the upper end of the negative pressure regulating valve plug 52. The spring support 54 and the valve support 32 securely hold a negative pressure spring 53 therebetween in a slightly compressed state. The negative pressure regulating valve plug 52 and the spring support 54 are composed of the same oil resistant resin as the casing 12 and the cover plate 29.

Figure 3:
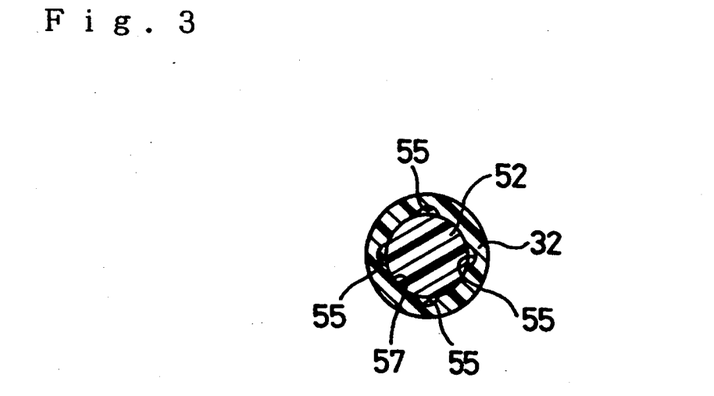
FIG. 3 is an enlarged cross sectional view taken on the line 3—3 of FIG. 1.

The arrangement and relationship between the negative pressure regulating valve mechanism 50 and the valve support 32 and the positive pressure regulating valve plug 34 is described more in detail FIG. 3 which is an enlarged cross sectional view taken on the line 3—3 of FIG. 1. Four semicircular first apertures 55 are formed at an equal pitch between the negative pressure regulating valve plug 52 and the valve support 32, that is, on an inner surface of the valve support 32. In a similar manner, four semicircular second apertures 56 (see FIGS. 1 and 2) are also formed at the same pitch as the first apertures 55 between the negative pressure regulating valve plug 52 and the positive pressure regulating valve plug 34. The first apertures 55 and the second apertures 56 have the same orientation so that the fuel vapor can pass through them easily. A through hole 57 of the valve support 32 (see FIG. 3) and a through hole of the positive pressure regulating valve plug 34, through which the negative pressure regulating valve plug 52 passes, have a diameter allowing the negative pressure regulating valve plug 52 to be freely movable in the vertical direction. The negative pressure spring 53 held by the spring support 54 is positioned by a step of the spring support 54 as well as an upright inner wall 58 of the valve support 32.

The negative pressure regulating valve plug 52 receives the upward force of the negative pressure spring 53 through the spring support 54, and is thereby lifted. An upper surface of the collar 51, which is the bottom part of the negative pressure regulating valve plug 52, is pressed upward against the internal ring projection 38 of the positive pressure regulating valve plug 34. At this time, the negative pressure regulating valve mechanism 50 is closed to disconnect the hollow 36 in the upper chamber 24 from the through hole 66 of the fuel shut-off part 65 and the lower chamber 26.

When the internal pressure of the fuel tank decreases and the canister pressure (the pressure in the upper chamber 24) is relatively heightened while the positive pressuring regulating valve mechanism 30 is closed (see FIGS. 1 and 2), the negative pressure regulating valve mechanism 50 is activated as described below. The force applied on an upper face of the spring support 54 of the negative pressure regulating valve mechanism 50 increases with the rise in the canister pressure. The negative pressure regulating valve plug 52, on the other hand, is pressed upward by the negative pressure spring 53 and thereby not moved until the canister pressure reaches a predetermined level. When the downward force to the negative pressure regulating valve plug 52 caused by the canister pressure becomes greater than its upward force, which is caused by the internal pressure of the fuel tank applied onto a lower face of the collar 51 and by the pressing force of the negative pressure spring 53, the negative pressure spring 53 is compressed, and the negative pressure regulating valve plug 52 comes down to separate the upper surface of the collar 51 from the internal ring projection 38. The negative pressure regulating valve mechanism 50 accordingly opens to connect the hollow 36 in the upper chamber 24 with the lower chamber 26 via the apertures 55 and 56 and the through hole 66.

In other words, the negative pressure regulating valve mechanism 50 operates in response to a pressure balance applied on the upper face of the spring support 54 and the lower face of the collar 51. The pressing force or the spring load of the negative pressure spring 53 is determined such that the negative pressure regulating valve mechanism 50 opens when the pressure in the lower chamber 26 (the internal pressure of the fuel tank) becomes lower, by a predetermined value, than the pressure in the hollow 36 of the upper chamber 24 (the canister pressure).

The safety valve mechanism 60, as shown in FIGS. 1 and 2, comprises a safety valve plug 61 composed of a rubber such as nitrile rubber or fluororubber. The safety valve plug 61 is fitted in and fixed to the ring projection 68 of the fuel shut-off part 65. The safety valve mechanism 60 also comprises a sealing ring projection 62 formed on the lower end of the safety valve plug 61. The safety valve mechanism 60 operates in cooperation with the support cylinder 35 and the positive pressure spring 31 which presses the sealing ring projection 62 against an upper face 63 of the partition wall 28.

The fuel shut-off part 65 constituting part of the safety valve mechanism 60 is connected with the support cylinder 35. When the external ring projection 37 of the positive pressure regulating valve plug 34 is seated on the bottom surface 39 of the support cylinder 35, the fuel shut-off part 65 is pressed downward by the positive pressure spring 31. In such a state, the safety valve plug 61 is pressed downward, and the sealing ring projection 62 is seated on the upper face 63 of the partition wall 28, whereby the safety valve mechanism 60 is closed. The internal pressure of the fuel tank is applied to the safety valve plug 61 via the vertical path 64 of the partition wall 28. The safety valve mechanism 60 thus operates responsive to a pressure balance across the safety valve plug 61. When the through hole 66 is open, the internal pressure is sufficiently adjusted by the positive pressure regulating valve mechanism 30 and the negative pressure regulating valve mechanism 50. The safety valve mechanism 60 functions only when the through hole 66 is blocked by the float valve 71 as described in detail below.

When the upward force exerted on the safety valve plug 61 caused by the internal pressure of the fuel tank becomes greater than the downward force caused by the canister pressure in the upper chamber 24 and by the pressing force of the positive pressure spring 31 while the through hole 66 is blocked, the safety valve plug 61 is lifted upward together with the support cylinder 35 and the positive pressure regulating valve mechanism 30 against the positive pressure spring 31. The sealing ring projection 62 of the safety valve plug 61 is thereby separated from the upper face 63 of the partition wall 28, whereby the safety valve mechanism 60 opens to connect the hollow 36 of the upper chamber 24 with the lower chamber 26 via the vertical path 64 of the partition wall 28. The internal pressure of the fuel tank at which the safety valve mechanism 60 opens, is referred to as a second valve-opening pressure P2. Here the second valve-opening pressure P2 of the safety valve mechanism 60 corresponds to a pressure difference between the canister pressure and the internal pressure of the fuel tank because the canister pressure is virtually constant.

As described above, the safety valve mechanism 60 opens to adjust the internal pressure of the fuel tank under the second valve-opening pressure P2 when the through hole 66 is closed and the internal pressure of the fuel tank is not adjustable by the positive pressure regulating valve mechanism 30 and the negative pressure regulating valve mechanism 50. The second valve-opening pressure P2 is therefore set higher than the first valve-opening pressure P1 of the positive pressure regulating valve mechanism 30.

The positive pressure spring 31 is used in common in the positive pressure regulating valve mechanism 30 and the safety valve mechanism 60 as mentioned above. The reason why the valve-opening pressure P1 of the positive pressure regulating valve mechanism 30 is lower than the valve-opening pressure P2 of the safety valve mechanism 60 is as follows.

The positive pressure regulating valve plug 34 of the positive pressure regulating valve mechanism 30 is pressed downward due to the canister pressure and the positive pressure spring 31, and it is forced upward by the internal pressure of the fuel tank. When the internal pressure of the fuel tank reaches the first valve-opening pressure P1 of the positive pressure regulating valve mechanism 30, the pressure balance across the positive pressure regulating valve plug 34 is expressed as:

$$PK1 + F/S1 = P1 \quad (1)$$

where PK1, S1, and F respectively denote a first canister pressure, a pressure receiving area of the positive pressure regulating valve plug 34, and a pressing force of the positive pressure spring 31. The pressure receiving area S1 is an area defined by the external ring projection 37 of the positive pressure regulating valve plug 34 which is seated on the bottom surface 39 of the support cylinder 35 shown in FIG. 2.

In a similar manner, when the internal pressure of the fuel tank reaches the second valve-opening pressure P2 of the safety valve mechanism 60, the pressure balance across the safety valve plug 61 is expressed as:

$$PK2 + F/S2 = P2 \quad (2)$$

where PK2, S2, and F respectively denote a second canister pressure, a pressure receiving area of the safety valve plug 61, and the pressing force of the positive pressure spring 31. The pressure receiving area S2 is an area defined by the sealing ring projection 62 of the safety valve plug 61 which is seated on the upper face 63 of the partition wall 28 shown in FIG. 2.

Since the first and second canister pressures PK1 and PK2 are the pressures of the canister itself and virtually equal to each other, the canister pressures PK1 and PK2 can thus be expressed as an identical value PK. The equations (1) and (2) are respectively rewritten as:

$$PK + F/S1 = P1 \quad (3)$$

$$PK + F/S2 = P2 \quad (4)$$

When the internal pressure of the fuel tank exceeds the first valve-opening pressure P1, the pressure balance across the positive pressure regulating valve plug 34, which is expressed by the equation (3), is broken to open the positive pressure regulating valve mechanism 30. On the other hand, when the internal pressure of the fuel tank exceeds the second valve-opening pressure P2, the pressure balance across the safety valve plug 61, which is expressed by the equation (4), is destroyed to open the safety valve mechanism 60.

The pressing force F of the spring 31 is given by the equations (3) and (4) as:

$$F = (P1 - PK) \times S1 = (P2 - PK) \times S2 \quad (5)$$

According to the equation (5), a ratio of S1/S2 is given as:

$$S2/S1 = (P1 - PK)/(P2 - PK) \quad (6)$$

Because the canister pressure PK, the pressing force F of the positive pressure spring 31, the first valve-opening pressure P1 and the second valve-opening pressure P2 are determined in the design phase of the fuel tank and the shut-off device 10, the pressure receiving area S1 of the positive pressure regulating valve plug 34 and the pressure receiving area S2 of the safety valve plug 61 are respectively determined to satisfy the equation (6). The pressure receiving area S1 is set greater than the pressure receiving area S2 because the second valve-opening pressure P2 is greater than the first valve-opening pressure P1.

When the internal pressure of the fuel tank reaches the first valve-opening pressure P1 of the positive pressure regulating valve mechanism 30, the equation (3) holds to open the positive pressure regulating valve mechanism 30. Since the first valve-opening pressure P1 is smaller than the second valve-opening pressure P2, it is also smaller than the value (PK+F/S2) at the left hand side of the equation (4). That is, the upward force to the safety valve plug 61 is less than its downward force. The positive pressure regulating valve mechanism 30 thus opens while the safety valve mechanism 60 is closed.

As described above, only one positive pressure spring 31 sufficiently functions to open both the positive pressure regulating valve mechanism 30 and the safety valve mechanism 60 at the respective valve-opening pressures P1 and P2. The internal pressure of the fuel tank reaches the second valve-opening pressure P2 of the safety valve mechanism 60 only when the through hole 66 of the fuel shut-off part 65 is blocked, the positive pressure regulating valve mechanism 30 is not therefore activated.

Suppose that the canister pressure PK is equal to a reference level of 0 mmAq, the pressing force F of the positive pressure spring 31 is set at 75 grams, the first valve-opening pressure P1 of the positive pressure regulating valve mechanism 30 at 300 mmAq, the second valve-opening pressure P2 of the safety valve mechanism 60 at 1,000 mmAq, the pressure receiving area S1 of the positive pressure regulating valve plug 34 at 250 mm$^2$, and the pressure receiving area S2 of the safety valve plug 61 at 70 mm$^2$, respectively.

Figure 4:
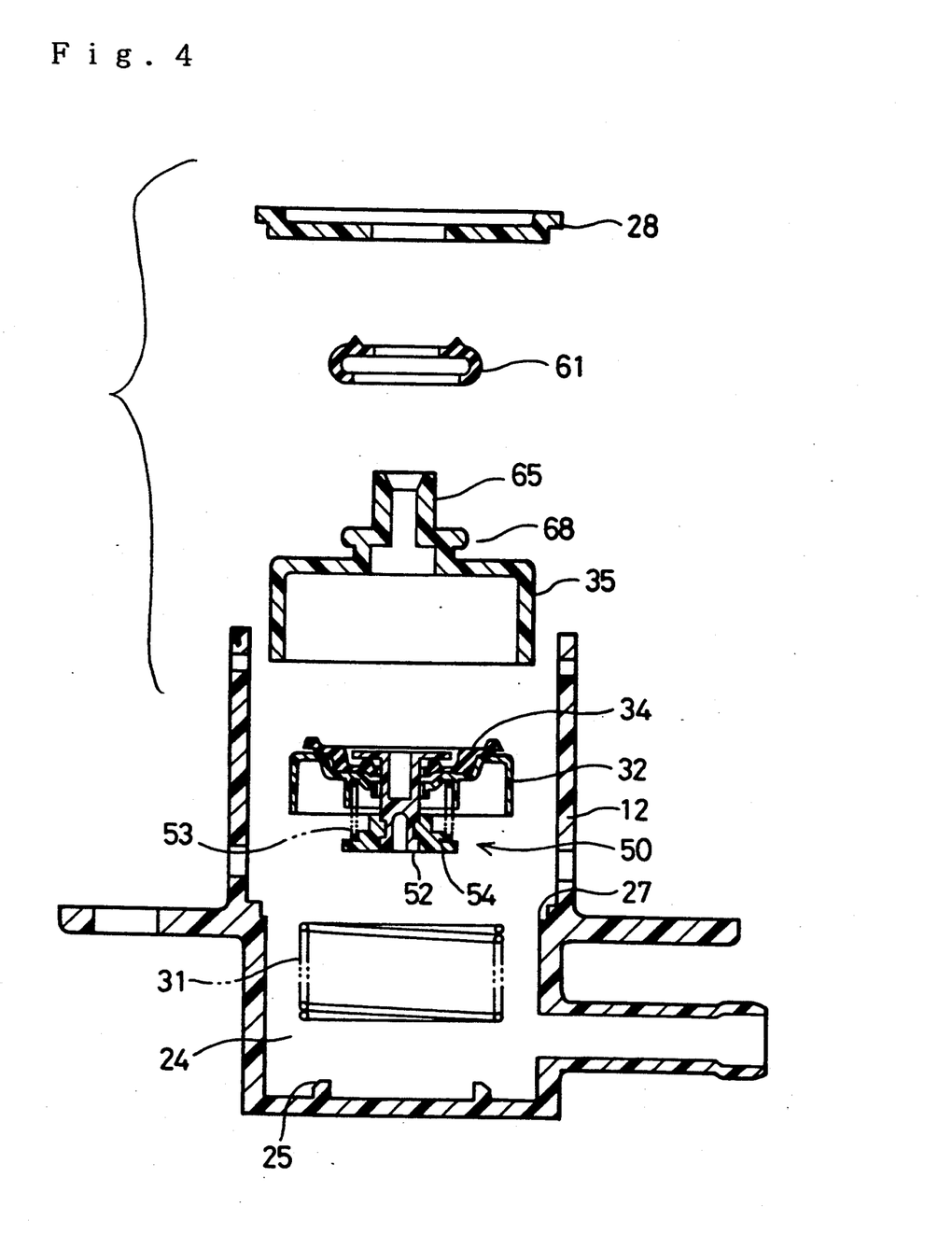
FIG. 4 is a view showing assembly of the positive pressure regulating valve mechanism 30, a negative pressure regulating valve mechanism 50, and the safety valve mechanism 60.

FIG. 4 is a view of the positive pressure regulating valve mechanism 30, the negative pressure regulating valve mechanism 50, and the safety valve mechanism 60 in the upper chamber 24 of the casing 12.

The casing 12 is set in a predetermined jig to have the opening on its upper end as seen in FIG. 4, and the various elements described above are then assembled in the casing 12 in the following order. After the positive pressure spring 31 is positioned to engage with the projection 25 of the upper chamber 24, an assembly including the valve support 32, the positive pressure regulating valve plug 34 as well as the negative pressure regulating valve mechanism 50, which are previously arranged as described above, is mounted on the positive pressure spring 31.

The support cylinder 35 with the safety valve plug 61 previously fixed to the ring projection 68 of the fuel shut-off part 65 is inserted into the casing 12 to orient the hollow 36 downward. The partition wall 28 is pressed downward to come into close contact and engage with a boundary step 27 between the upper chamber 24 and the lower chamber 26, and then ultrasonically welded to the boundary step 27 via a horn of an ultrasonic welding machine (not shown). The upper chamber 24 and the lower chamber 26 are consequently airtightly divided by the partition wall 28. The positive pressure regulating valve mechanism 30, the negative pressure regulating valve mechanism 50, and the safety valve mechanism 60 are accordingly accommodated and assembled in the upper chamber 24 of the casing 12. The casing 12 may be oriented transversely or upside down according to the requirements of the assembling process.

After the partition wall 28 is welded to the boundary step 27, the positive pressure spring 31 presses both the support cylinder 35 and the valve support 32 of the positive pressure regulating valve mechanism 30. The external ring projection 37 of the positive pressure regulating valve plug 34 is seated on the bottom surface 39 of the support cylinder 35 while the sealing ring projection 62 of the safety valve plug 61 is seated on the upper face 63 of the partition wall 28. This arrangement effectively prevents the external ring projection 37 and the safety valve plug 61 from being unintentionally shifted in the transverse direction. Since the position of the positive pressure spring 31 is defined by the projection 25, the external ring projection 37 and the safety valve plug 61 are arranged substantially in a concentric manner.

A fuel shut-off valve mechanism 70 installed in the lower chamber 26 of the casing 12 is described hereinafter according to FIG. 1. The fuel shut-off valve mechanism 70 efficiently prevents fuel liquid from undesirably flowing out to the canister even when the level of fuel liquid fluctuates in the fuel tank due to abrupt turning of a vehicle.

The fuel shut-off valve mechanism 70 comprises the float valve 71 moving up and down responsive to fluctuation of the surface of fuel liquid in the fuel tank, and a spring 72 pressing the float valve 71 upwardly. The fuel shut-off valve mechanism 70 functions as a float valve in cooperation with the fuel shut-off part 65 of the support cylinder 35. Here the spring 72 is used to lower an apparent specific gravity of the float valve 71. The spring load of the spring 72 is determined to allow the float valve 71 to be in contact with the cover plate 29 by the dead load of the float valve 71 when no fuel liquid flows into the lower chamber 26. The float valve 71 is composed of the same oil resistant resin as the casing 12 and the cover plate 29.

The float valve 71 has a valve cone 73 at the top thereof, and includes a spring chamber 74 for accommodating the spring 72 as well as an air reservoir 75 inside thereof. The float valve 71 further includes a plurality of guide fins 76 disposed circumferentially at equal intervals to have a predetermined clearance from the inner surface of the casing 12 when the float valve 71 is positioned in the lower chamber 26.

The lower opening of the casing 12 is closed with the cover plate 29, which includes an engagement piece 78 engaging with an engaging aperture 77 formed on the circumference of the lower end of the casing 12. The cover plate 29 is fixed to the lower opening of the casing 12 through engagement of the engagement piece 78 with the engaging aperture 77. The cover plate 29 has a projection 80 on its center for positioning the spring 72.

When fuel liquid flows into the lower chamber 26 to raise the float valve 71, the valve cone 73 of the float valve 71 is securely fitted in the float seal surface 67 formed on the lower end of the through hole 66 of the fuel shut-off part 65. The float valve 71 of the fuel shut-off valve mechanism 70 thus closes the through hole 66 to prevent fuel liquid from unintentionally flowing out to the canister. Since the float valve 71 is guided in the lower chamber 26 by the guide fins 76, the valve cone 73 is accurately and precisely fitted in the float seal surface 67.

The fuel shut-off valve mechanism 70 is installed in the casing 12 according to the following steps. After the partition wall 28 is ultrasonically welded to the casing 12, the float valve 71 is inserted into the lower chamber 26 through the opening of the casing 12. The spring 72 is then inserted into the spring chamber 74 and further pressed in by the cover plate 29 laid over the opening of the casing 12. At this moment, the engagement piece 78 of the cover plate 29 engages with the engaging aperture 77 of the casing 12, and the fuel shut-off valve mechanism 70 is disposed in the lower chamber 26 of the casing 12, accordingly. The fuel shut-off valve mechanism 70 is installed, after the other valve mechanisms 30, 50, and 60, into the casing 12 which is set in the predetermined jig to have the opening on its upper end as described above.

Operation of the fuel shut-off device 10 is described first under the conditions while a vehicle is driven at a constant-speed or while parked such that the level of fuel liquid does not fluctuate in the fuel tank enough for the fuel liquid to flow into the lower chamber 26 of the casing 12.

When the internal pressure of the fuel tank does not reach the first valve-opening pressure P1 of the positive pressure regulating valve mechanism 30, the negative pressure regulating valve mechanism 50, and the safety valve mechanism 60 are all closed, as shown in FIGS. 1 and 2. Since no fuel liquid flows into the lower chamber 26 of the casing 12, the fuel shut-off valve mechanism 70 does not block the through hole 66 of the fuel shut-off part 65.

When fuel liquid is vaporized in the fuel tank and the internal pressure of the fuel tank rises under the above conditions, the pressure in the lower chamber 26 of the casing 12 increases accordingly. The pressure rise in the lower chamber 26 then increases the pressure applied onto the positive pressure regulating valve plug 34, which is connected to the lower chamber 26 via the through hole 66 of the fuel shut-off part 65. Continuous evaporation of fuel liquid in the fuel tank makes the internal pressure of the fuel tank greater than the canister pressure in the upper chamber 24, and greater than the first valve-opening pressure P1 of the positive pressure regulating valve mechanism 30. The pressure balance across the positive pressure regulating valve plug 34 is broken here, and the positive pressure regulating valve plug 34 is pressed upward against the pressing force of the positive pressure spring 31 and the canister pressure. The press-up movement of the positive pressure regulating valve plug 34 separates the external ring projection 37 from the bottom surface 39 of the support cylinder 35 to open the positive pressure regulating valve mechanism 30.

Figure 5:
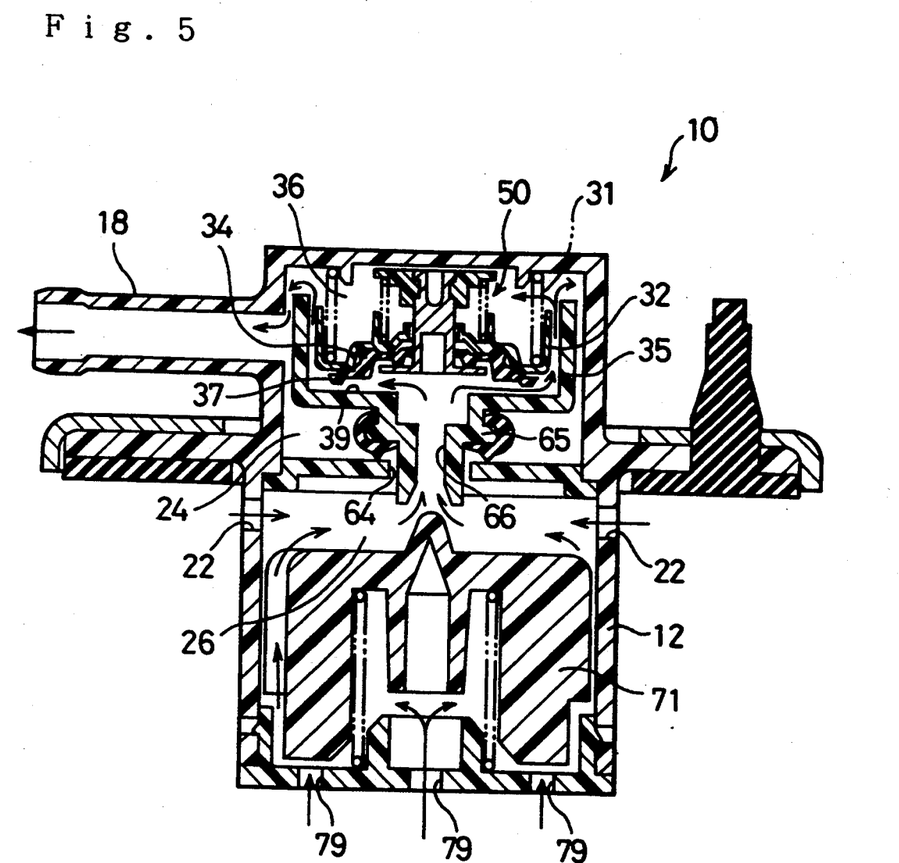
FIG. 5 illustrates adjustment of the internal pressure of the fuel tank by the fuel shut-off device 10.

As shown by the arrows in FIG. 5, the fuel vapor flows into the lower chamber 26 through the vapor holes 22 of the casing 12 and a plurality of fuel-inlet apertures 79 of the cover plate 29, and passes through the through hole 66, a gap between the external ring projection 37 and the bottom surface 39, the hollow 36, and the vent port 18 to the canister. Consequently, the internal pressure of the fuel tank is lowered while the fuel vapor is adsorbed in the canister.

The positive pressure regulating valve mechanism 30 opens as described above when the internal pressure of the fuel tank is approximately equal to the first valve-opening pressure P1 which is less than the second valve-opening pressure P2 of the safety valve mechanism 60. Under such a condition, the safety valve mechanism 60 is maintained in its closed state. The internal pressure of the fuel tank is also applied the lower face of the collar 51 of the negative pressure regulating valve mechanism 50 in the closed state. The negative pressure regulating valve mechanism 50 as a whole is therefore pressed upward together with the positive pressure regulating valve plug 34.

When the internal pressure of the fuel tank decreases to the first valve-opening pressure P1 through the emission of the fuel vapor, the pressure is again balanced across the positive pressure regulating valve plug 34. Further decrease in the internal pressure of the fuel tank causes the positive pressure spring 31 to press the positive pressure regulating valve plug 34 downward to seat the external ring projection 37 onto the bottom surface 39 of the support member 30, thus closing the positive pressure regulating valve mechanism 30 to stop emission of the fuel vapor to the canister.

On the contrary, the internal pressure of the fuel tank may decrease to be lower than the canister pressure. When a difference between the internal pressure of the fuel tank and the canister pressure exceeds a predetermined value, the balance of pressure applied onto the upper face of the spring support 54 and onto the lower face of the collar 51 is broken in the negative pressure regulating valve mechanism 50, and the negative pressure regulating valve plug 52 is pressed downward against the pressing force of the negative pressure spring 53 and the internal pressure of the fuel tank. The press-down movement of the negative pressure regulating valve plug 52 separates the contact surface of the collar 51 from the internal ring projection 38 so as to open the negative pressure regulating valve mechanism 50. Decrease in the internal pressure of the fuel tank may be ascribed to reduction of the fuel vapor in the fuel tank due to the temperature drop or to rapid fuel consumption.

Figure 6:
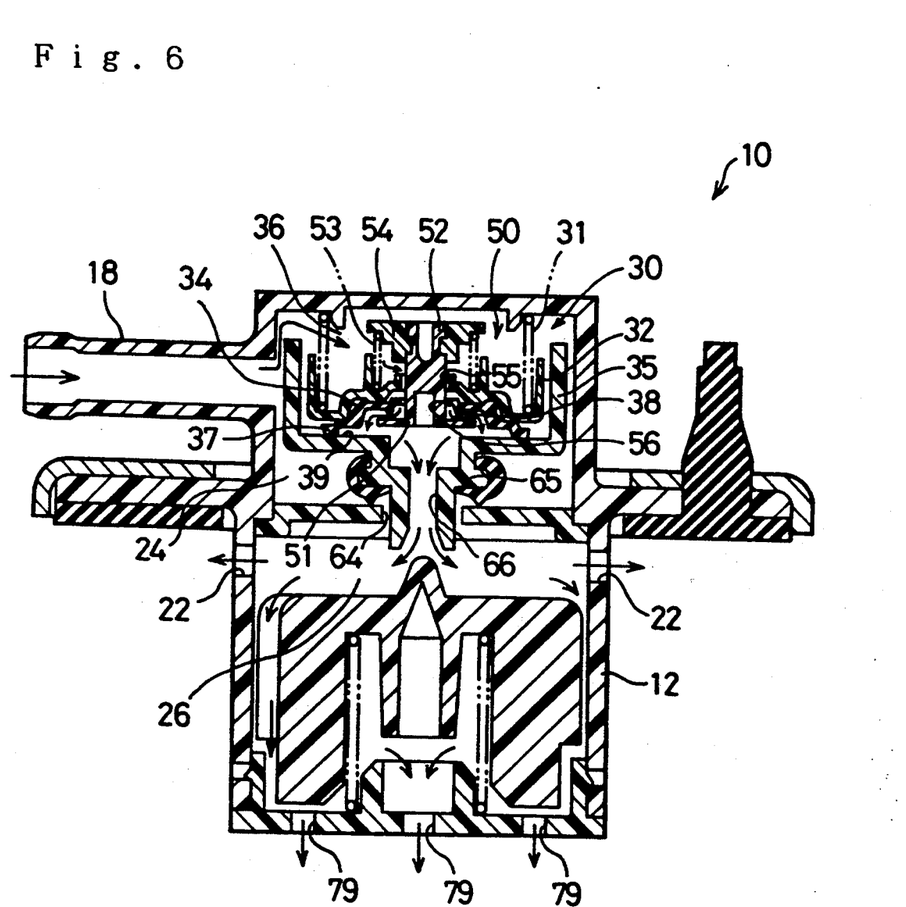
FIG. 6 also illustrates adjustment of the internal pressure of the fuel tank by the fuel shut-off device 10.

As shown by the arrows in FIG. 6, the fuel vapor discharged from the canister passes through the vent port 18, the hollow 36, the first apertures 55 of the valve support 32, the second apertures 56 of the positive pressure regulating valve plug 34, a gap between the internal ring projection 38 and the contact surface of the collar 51, and the through hole 66 into the lower chamber 26, and flows into the fuel tank via the vapor holes 22 and the fuel-inlet apertures 79. The internal pressure of the fuel tank accordingly increases relative to the canister pressure. When the difference between the internal pressure of the fuel tank and the canister pressure is within the predetermined value, the pressure applied to the upper face of the spring support 54 is again balanced with the pressure applied to the lower face of the collar 51. The recovery of pressure balance causes the negative pressure spring 53 to press the negative pressure regulating valve plug 52 upward to seat the internal ring projection 38 onto the contact surface of the collar 51 as shown in FIG. 1, thus closing the negative pressure regulating valve mechanism 50 so as to stop effusion of the fuel vapor.

As described above, the internal pressure of the fuel tank is adjusted to be within a predetermined range by operation of the positive pressure regulating valve mechanism 30 and the negative pressure regulating valve mechanism 50.

Operation of the fuel shut-off device 10 is described hereinafter under the conditions, such as abrupt turning of a vehicle or driving on a rough road or steep slope, such that the level of fuel liquid fluctuates in the fuel tank enough for the fuel liquid to flow into the lower chamber 26 of the casing 12.

Figure 7:
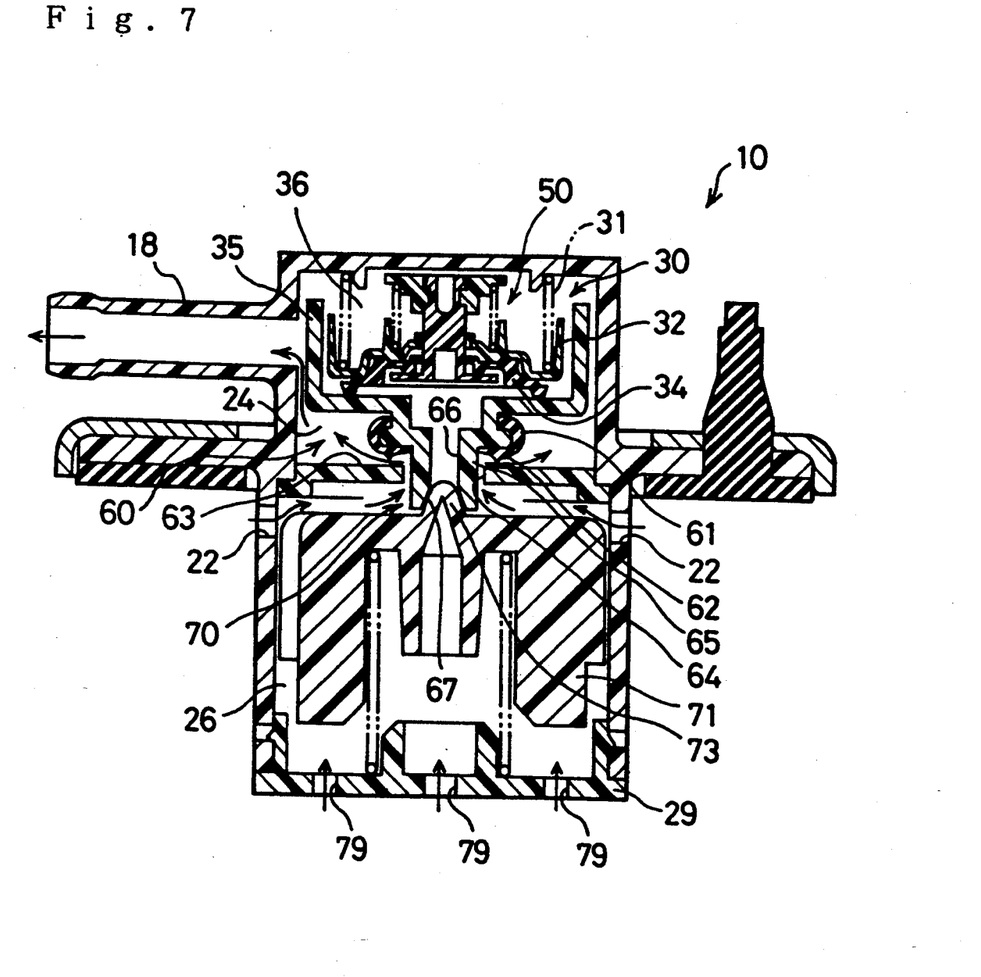
FIG. 7 illustrates prevention of undesirable effusion of fuel gas from the fuel shut-off device 10.

When a vehicle turns abruptly, the level of fuel liquid fluctuates in the fuel tank, and fuel liquid flows into the lower chamber 26 via the fuel-inlet apertures 79 as shown in FIG. 7. At this time, the float valve 71 is lifted by buoyancy, and the valve cone 73 of the float valve 71 is fitted into the through hole 66 of the fuel shut-off part 65 to come into close contact with the float seal surface 67. This blocking of the through hole 66 prevents fuel liquid from flowing out to the canister.

When fluctuation of the level of fuel liquid decreases in the fuel tank and fuel liquid in the lower chamber 26 returns to the fuel tank via the fuel-inlet apertures 79 before the internal pressure of the fuel tank increases enough, the buoyancy applied onto the float valve 71 is reduced and the float valve 71 descends to its lower position by the dead load thereof. Here the valve cone 73 is removed from the float seal surface 67, and the internal pressure of the fuel tank is adjusted into the predetermined range by the positive pressure regulating valve mechanism 30 and the negative pressure regulating valve mechanism 50 as described above.

Under the condition that the through hole 66 is blocked by the float valve 71, the fuel vapor does not flow into the canister via the through hole 66. When a large quantity of fuel liquid is vaporized, for example, by the temperature rise in the atmosphere under the above condition, the internal pressure of the fuel tank abruptly increases to exceed the first valve-opening pressure P1 of the positive pressure regulating valve mechanism 30.

The increased internal pressure of the fuel tank does not affect the positive pressure regulating valve plug 34, but is applied only onto the safety valve plug 61 via the vertical path 64 of the partition wall 28 because the through hole 66 is blocked by the float valve 71. When the internal pressure of the fuel tank further increases up to the second valve-opening pressure P2, the pressure balance across the safety valve plug 61 is broken, and the safety valve plug 61 is pressed upward against the pressing force of the positive pressure spring 31 and the canister pressure as shown in FIG. 7. The sealing ring projection 62 of the safety valve plug 61 is thus separated from the upper face 63 of the partition wall 28, and the safety valve mechanism 60 opens to balance the pressure.

As shown by the arrows in FIG. 7, the fuel vapor flowing into the lower chamber 26 through the vapor holes 22 passes through the vertical path 64 of the partition wall 28 to the upper chamber 24 and then through the vent port 18 into the canister. Consequently, the internal pressure of the fuel tank is lowered while the fuel vapor flowing into the canister is adsorbed in the canister. Flow of the fuel vapor into the upper chamber 24 cancels the pressure difference between the upper chamber 24 and the lower chamber 26, whereby the float valve 71 descends to its lower position with return flow of fuel liquid from the lower chamber 26.

When the internal pressure of the fuel tank is lowered to the second valve-opening pressure P2 by the effusion of the fuel vapor, the pressure balance across the safety valve plug 61 is recovered and the safety valve plug 61 is pressed downward by the positive pressure spring 31. This allows the sealing ring projection 62 of the safety valve plug 61 to be seated onto the upper face 63 of the partition wall 28, thus closing the safety valve mechanism 60 to stop the effusion of the fuel vapor. When the internal pressure of the fuel tank again increases while the through hole 66 is blocked, the internal pressure of the fuel tank is effectively regulated through operation of the safety valve mechanism 60. That is, the internal pressure of the fuel tank is adjusted under the second valve-opening pressure P2 even when the through hole 66 is blocked to prevent fuel liquid from flowing out to the canister.

After the float valve 71 descends to its lower position, the internal pressure of the fuel tank adjusted under the second valve-opening pressure P2 is further regulated through operation of the positive pressure regulating valve mechanism 30 and the negative pressure regulating valve mechanism 50.

As described above, in the fuel shut-off device 10 of the embodiment, only one positive pressure spring 31 presses both the external ring projection 37 and the sealing ring projection 62 to close the positive pressure regulating valve mechanism 30 and the safety valve mechanism 60, respectively. In the structure of the embodiment, the relationship between the pressure receiving area S1 of the positive pressure regulating valve mechanism 30 and the pressure receiving area S2 of the safety valve mechanism 60 is determined according to the relationship between the first valve-opening pressure P1 and the second valve-opening pressure P2. In the fuel shut-off device 10, the positive pressure regulating valve mechanism 30 and the safety valve mechanism 60 respectively receive the internal pressure of the fuel tank and open at the first and second valve-opening pressures P1 and P2, accordingly. The use of the positive pressure spring 31 working both in the positive pressure regulating valve mechanism 30 and the safety valve mechanism 60 reduces the number of parts in the fuel shut-off device 10, thus simplifying the structure of the fuel shut-off device 10.

The various elements or constituents of the fuel shut-off device 10 are assembled in one direction through the opening of the casing 12. This simplifies the assembling process and improves the working efficiency. These advantages are further reinforced through pre-assembly or sub-assembly of the negative pressure regulating valve mechanism 50 with the positive pressure regulating valve plug 34 and the valve support 32 of the positive pressure regulating valve mechanism 30 or of the safety valve plug 61 with the support cylinder 35.

The ultrasonic welding of the partition wall 28 to the casing 12 is the only sealed portion in the fuel shut-off device 10 of the embodiment. Since no sealed portion is exposed to the atmosphere, the fuel shut-off device 10 has excellent sealing performance and airtightness.

Figure 8:
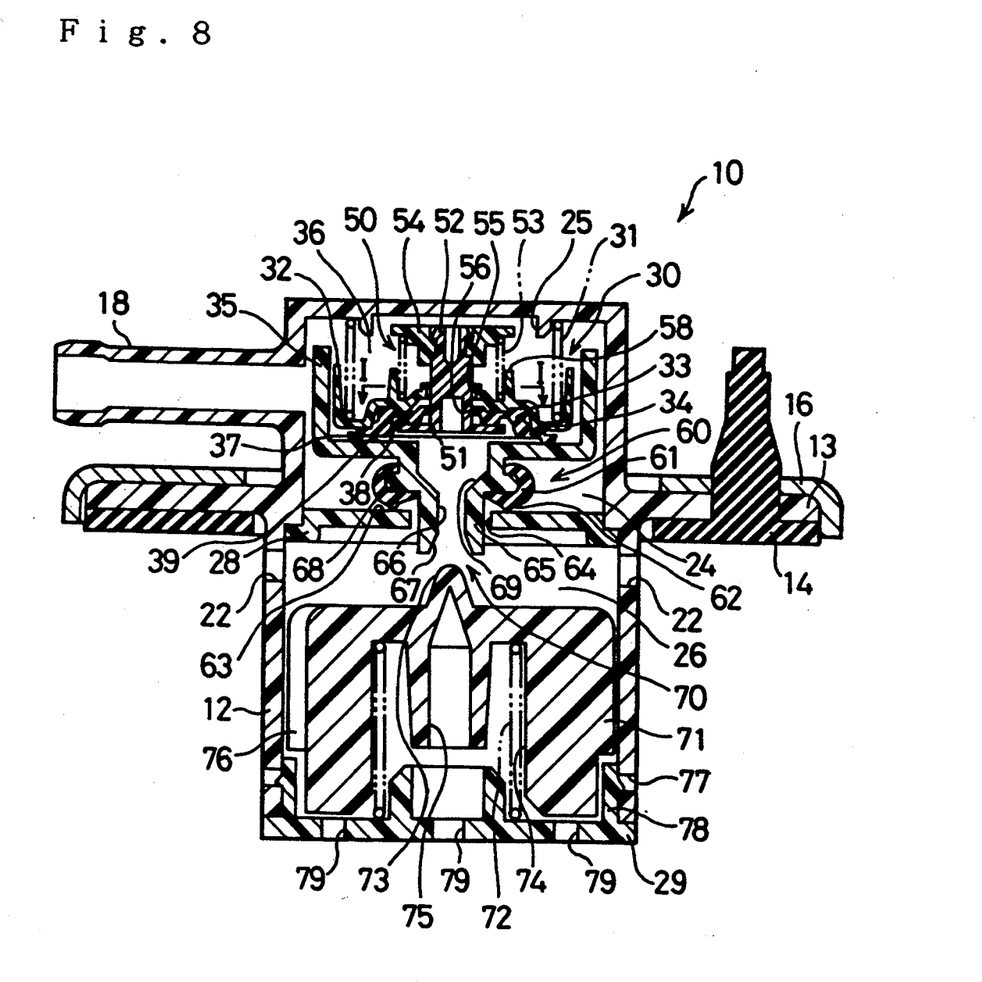
FIG. 8 is a cross sectional view showing an example of modification of the fuel shut-off device 10.

In the fuel shut-off device 10 of the embodiment, the step 69 is formed above the through hole 66 of the fuel shut-off part 65 constituting a conduit of the fuel vapor. While the float valve 71 is in its upper position to block the through hole 66, the step 69 works to store fuel liquid which flows in the through hole 66 prior to the blocking and runs against the lower face of the collar 51 to drop on the step 69. The stored fuel liquid is returned to the fuel tank when the float valve 71 descends to open the through hole 66. This structure allows fuel liquid flowing in the through hole 66 to be efficiently returned to the fuel tank. The step 69 can be formed as a slant face as shown in FIG. 8 to make recovery of fuel liquid easier.

The fuel shut-off device 10 of the embodiment effectively prevents fuel liquid from flowing out to the canister when the level of fuel liquid greatly fluctuates in the fuel tank due to abrupt turning of a vehicle or driving on a rough road or steep slope. In the fuel shut-off device 10, the internal pressure of the fuel tank is adjusted under the first valve-opening pressure P1 of the positive pressure regulating valve mechanism 30 or the second valve-opening pressure P2.

Figure 9:
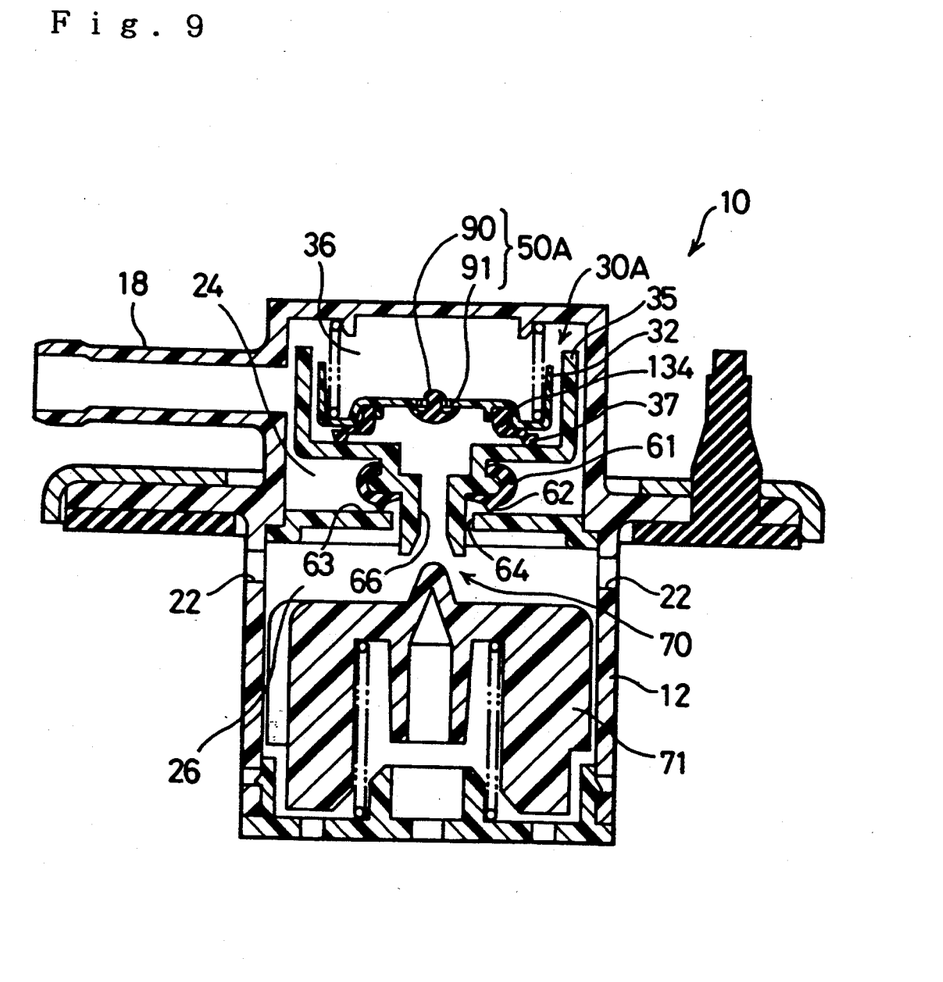
FIG. 9 is a cross sectional view showing another example of modification of the fuel shut-off device 10.

FIG. 9 shows another structure of a fuel shut-off device according to the present invention. A positive pressure regulating valve mechanism 30A comprises a positive pressure regulating valve plug 134 having an external ring projection 37 in place of the positive pressure regulating valve plug 34 having both the external ring projection 37 and the internal ring projection 38. The positive pressure regulating valve plug 134 is fitted into and fixed to the valve support 32. A negative pressure regulating valve mechanism 50A comprises an umbrella valve 90 which is fitted into and fixed to the valve support 32 while an umbrella portion of the valve 90 is turned over. The periphery of the umbrella valve 90 is easily deformed because the umbrella valve 90 is made of rubber. If the internal pressure of the fuel tank becomes lower by a predetermined value than the canister pressure, the umbrella valve 90 deforms to open and allows the fuel vapor to flow through an aperture 91 of the valve support 32 down to the lower chamber 26. The negative pressure regulating valve mechanism 50A of this alternative structure effectively adjusts the internal pressure of the fuel tank based on the pressure balance between the hollow 36 and the lower chamber 26 with the umbrella valve 90. Since the negative pressure regulating valve mechanism 50A does not require the negative pressure regulating valve plug 52 and the spring support 54, the whole structure of the modified device becomes simpler than that of the above embodiment.

In the fuel shut-off device 10 of the first embodiment, the pressure receiving area S1 of the positive pressure regulating valve plug 34 and the pressure receiving area S2 of the safety valve plug 61 are determined on the basis of the first valve-opening pressure P1 of the positive pressure regulating valve mechanism 30, the second valve-opening pressure P2, and the pressing force F of the positive pressure spring 31 as well as the canister pressure PK (see the equation (6)). Suppose that the canister pressure PK is almost always constant, it can be set at zero as a reference pressure. The equation (6) can be rewritten accordingly as:

$$S2/S1 = P1/P2 \qquad (7)$$

The first and second pressure receiving areas S1 and S2 are determined based on the first and second valve-opening pressures P1 and P2 according to the equation (7).

As described above, in the fuel shut-off device of the invention, only one spring is used to press the respective valve plugs of the positive pressure regulating valve mechanism and the safety valve mechanism, which directly affects adjustment of the internal pressure of the fuel tank. The first pressure area wherein the valve plug of the positive pressure regulating valve mechanism receives the internal pressure of the fuel tank to open the positive pressure regulating valve is set greater than the second pressure area wherein the valve plug of the safety valve mechanism receives the same to open the safety valve. The valve plug of the safety valve mechanism accordingly receives greater pressure corresponding to the pressing force of the spring than that of the positive pressure regulating valve mechanism. When the internal pressure of the fuel tank reaches the first valve-opening pressure of the positive pressure regulating valve mechanism, the pressure balance across the valve plug is broken to open the positive pressure regulating valve mechanism whereas the pressure balance across the valve plug of the safety valve mechanism is not broken due to the greater pressure corresponding to the pressing force of the spring. In the fuel shut-off device of the invention, the pressure balance is broken at the respective valve-opening pressures. This structure allows the positive pressure regulating valve mechanism and the safety valve mechanism to open at the respective valve-opening pressures. The fuel-shut off device of the invention has a simpler structure than the conventional device since only one spring is applied to close both the positive pressure regulating valve mechanism and the safety valve mechanism.

It is clearly understood that the above embodiments are only illustrative and not restrictive in any sense, and the spirit and scope of the present invention is limited only by the terms of the appended claims. For example, elastic body such as rubber can be used instead of spring.

What is claimed is:

1. A fuel shut-off device for controlling an internal pressure of a fuel tank and preventing effusion of fuel liquid from the fuel tank, said fuel shut-off device comprising:

a casing having a connection port adapted to be coupled with an external apparatus;

a partition wall for dividing a space in said casing into an upper chamber having said connection port and a lower chamber, said lower chamber having a first opening for introducing fuel vapor and fuel liquid from the fuel tank, said partition wall having a connection hole to connect said upper chamber with said lower chamber;

an upper chamber division plate disposed in said upper chamber to be vertically movable therein for dividing said upper chamber into a first upper section and a second upper section arranged below said first upper section, said upper chamber division plate having a second opening which allows flow of said fuel vapor between said first upper section and said second upper section, said upper chamber division plate further including a conduit penetrating through said connection hole, said conduit connecting said first upper section and said lower chamber;

first force applying means disposed in said first upper section of said upper chamber for applying a first pressing force to said upper chamber division plate toward said partition wall;

a first valve mechanism disposed in said first upper section for decreasing the internal pressure of the fuel tank, said first valve mechanism having a first valve plug for opening and closing a top of said conduit responsive to the internal pressure of the fuel tank;

a float valve disposed in said lower chamber for closing a bottom of said conduit in response to a flow of fuel liquid into said lower chamber; and a second valve mechanism disposed in said second upper section for decreasing the internal pressure of the fuel tank, said second valve mechanism having a second valve plug for opening and closing a path between said conduit and said connection hole responsive to the internal pressure of the fuel tank, wherein said first valve plug is seated on an upper surface of said upper chamber division plate, said first valve plug receiving an internal pressure of said upper chamber and said first pressing force of said first force applying means toward said upper chamber division plate, said first valve plug having a first pressure receiving area for receiving internal pressure of said lower chamber through said conduit in a direction to separate said first valve plug from said upper surface of said upper chamber division plate;

said second valve plug moving with said conduit to seat on an upper surface of said partition wall, said second valve plug receiving the internal pressure of said upper chamber and said first pressing force of said first force applying means transmitted via said first valve plug and said upper chamber division plate to press said second valve plug against said upper surface of said partition wall, said second valve plug having a second pressure receiving area for receiving the internal pressure of said lower chamber through said path in a direction to separate said second valve plug from said upper surface of said partition wall, said second pressure receiving area of said second valve plug being smaller than said first pressure receiving area of said first valve plug, said first and second valve mechanism being constructed and arranged to receive substantially the same pressing force.

2. A fuel shut-off device in accordance with claim 1, wherein said first valve plug has an aperture connecting said conduit with said upper chamber; and said first valve mechanism further comprises a third valve mechanism for opening and closing said aperture responsive to the internal pressure of the fuel tank to increase the internal pressure of the fuel tank, said third valve mechanism having a third valve plug to be seated on said first valve plug to open and close said aperture, said third valve plug receiving the internal pressure of said upper chamber in a direction to open said aperture, said third valve plug further receiving a second pressing force and the internal pressure of said lower chamber through said conduit in a direction to close said aperture.

3. A fuel shut-off device in accordance with claim 2, wherein said connection port is adaptable to be coupled with an activate charcoal canister.

4. A fuel shut-off device in accordance with claim 2, wherein said casing comprises a main body having a closed end and an open end, and a cover member for closing said open end of said main body, and said partition wall 28 divides a space in said casing into said upper chamber at a side of said closed end of said main body and said lower chamber at a side of said open end of said main body.

5. A fuel shut-off device in accordance with claim 4, wherein said casing, said partition wall, said upper chamber division plate, said tubular member, and said float valve are composed of a resin resistant to fuel contained in the fuel tank.

6. A fuel shut-off device in accordance with claim 5, wherein said partition wall is ultrasonically welded to said main body of said casing.

7. A fuel shut-off device in accordance with claim 2, wherein said third valve mechanism further comprises second force applying means applying said second pressing force to said third valve plug.

8. A fuel shut-off device in accordance with claim 2, wherein said third valve plug comprises an umbrella-shaped portion 90 made of rubber, said umbrella-shaped portion causing said second pressing force to close said aperture.

9. A fuel shut-off device in accordance with claim 2, wherein said conduit has an upper part and a lower part, said upper part having a space larger than said lower part.

10. A fuel shut-off device in accordance with claim 9, wherein a wall between said upper part and said lower part is tapered.

* * * * *